UNITED STATES PATENT OFFICE.

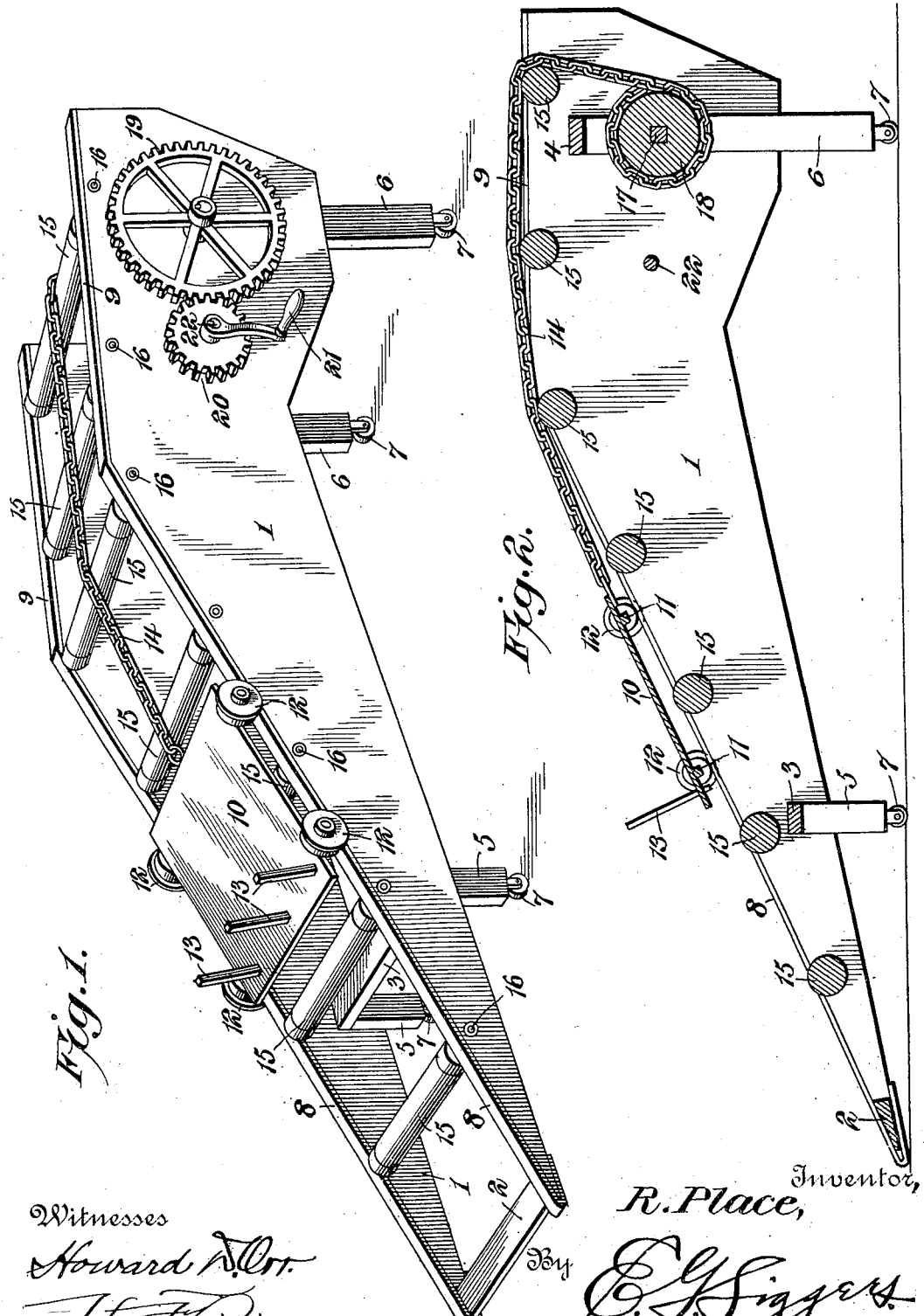

RILEY PLACE, OF GREENLEAF, WISCONSIN, ASSIGNOR OF ONE-HALF TO HELMUTH F. PRUST, OF GREENLEAF, WISCONSIN.

PORTABLE LIFTING DEVICE.

No. 825,156.     Specification of Letters Patent.     Patented July 3, 1906.

Application filed November 11, 1905. Serial No. 286,939.

*To all whom it may concern:*

Be it known that I, RILEY PLACE, a citizen of the United States, residing at Greenleaf, in the county of Brown and State of Wisconsin, have invented a new and useful Portable Lifting Device, of which the following is a specification.

The invention relates to improvements in lifting devices.

The object of the present invention is to improve the construction of lifting devices and to provide a simple and comparatively inexpensive lifting device designed, primarily, for loading and unloading railway-cars and other vehicles and adapted to enable heavy loads to be readily raised or lowered.

A further object of the invention is to provide a portable lifting device of this character adapted to be readily moved from one car or vehicle to another.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a portable lifting device constructed in accordance with this invention. Fig. 2 is a longitudinal sectional view of the same.

Like numerals of reference designate corresponding parts in both figures of the drawings.

The frame of the lifting device is composed of two sides 1, suitably connected by transverse bars 2, 3, and 4, and the said frame is also provided with front and rear legs 5 and 6, arranged in pairs and having caster-wheels 7 to enable the lifting device to be readily moved from one car or place to another. The transverse bar 2 is arranged at the front end of the frame, and the bars 3 and 4, which are located at the intermediate and rear portions of the frame, are arranged directly above the legs 5 and 6, which are suitably secured to the inner faces of the sides of the frame. The front and intermediate portions of the frame are tapered to provide inclined upper edges, to which are secured track-bars 8, and the upper edges of the rear portions of the sides are horizontal and receive horizontal portions 9 of the track-bars 8.

The track receives a car 10, consisting, preferably, of a platform provided with axles 11 and having flanged wheels 12 arranged to run on the track, the flanges engaging the outer side edges of the track and preventing any lateral displacement of the car. The car, which is adapted to receive various kinds of merchandise, is preferably provided at its front portion with standards 13 for retaining the load on the platform or supporting portion of the car; but any other suitable means may be employed for this purpose. The inner or rear end of the car is connected with a cable or chain 14, which is arranged to run over a series of transverse rollers 15 and which is connected with a suitable windlass. The transverse rollers 15, which are arranged at regular intervals, are interposed between the sides of the frame and are provided at their ends with journals 16, which are received in suitable bearings of the sides of the frame. The upper portions of the transverse rollers are arranged in substantially the same plane as the face or tread of the track and are adapted to maintain the draft continually in the direction of the movement of the car from one end of the device to the other. The chain extends downward from the roll at the rear end of the series to a windlass-shaft 17, which carries a drum 18, around which the chain is wound to move the car up the incline of the frame and inward or rearward on the horizontal portion of the same. The windlass-shaft, which is journaled in suitable bearings of the sides of the frame, has one end extended, and a large gear 19 is keyed or otherwise secured to the extended end of the windlass-shaft. A small pinion 20 meshes with the large gear and is rotated by a crank 21. The small gear, which enables a heavy load on the car to be easily lifted, is keyed or otherwise secured to a transverse shaft 22, and the crank-handle 21 is suitably secured to the shaft. When the drum 18 is rotated in one direction, the chain will be wound around it, and when it is rotated in the opposite direction the chain will be unwound from it, the weight of the load operating to move the car down the incline as the chain unwinds.

It will be seen that the lifting device is exceedingly simple and inexpensive in construction, that it possesses great strength and durability, and that it is adapted to enable heavy loads to be easily and rapidly transferred from the ground or other supporting-surface to a car, and vice versa.

Having thus fully described my invention, what I claim as new, and desire to secure by Letters Patent, is—

1. A device of the class described comprising a frame having spaced sides and provided with an inclined track, a car arranged to run on the track, a flexible connection attached to the car, and a series of transverse rollers connecting the sides of the frame and having their upper portions arranged in substantially the same plane as the face or tread of the track, said rollers being located at intervals and supporting the flexible connection, whereby the draft is maintained continually in the direction of the movement of the car throughout the entire length of the device.

2. A device of the class described, comprising a frame provided with spaced sides and having an inclined track, a car arranged to run on the track and having a flexible connection for actuating it, a series of transverse rollers mounted between the sides of the frame with their upper portions arranged in substantially the same plane as the upper face or tread of the track, said rollers being arranged at intervals from the front to the back of the frame and supporting the flexible connection, whereby the draft is maintained in the direction of the movement of the car throughout the entire length of the device, and a windlass located beneath the rear roller and connected with the flexible connection.

3. In a device of the class described, the combination of a frame comprising spaced tapering sides, the upper edges of which form an inclined track, front and rear depending legs secured to the sides and provided with supporting-rollers, and cross-bars arranged on the upper ends of the legs and connecting the sides of the frame, a car arranged to run on the track and provided with a flexible connection, rollers arranged at intervals and supporting the flexible connection, and a windlass connected with the flexible connection for operating the car.

In testimony that I claim the foregoing as my own I have hereto affixed my signature in the presence of two witnesses.

RILEY PLACE.

Witnesses:
HELEN SAENGER,
R. M. PRUST.